US010838396B2

(12) United States Patent
Byers et al.

(10) Patent No.: US 10,838,396 B2
(45) Date of Patent: Nov. 17, 2020

(54) CONNECTING ROBOTIC MOVING SMART BUILDING FURNISHINGS

(71) Applicant: Cisco Technology, Inc., San Jose, CA (US)

(72) Inventors: Charles Calvin Byers, Wheaton, IL (US); Joseph Michael Clarke, Raleigh, NC (US); Gonzalo Salgueiro, Raleigh, NC (US); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 453 days.

(21) Appl. No.: 15/490,050

(22) Filed: Apr. 18, 2017

(65) Prior Publication Data

US 2018/0299864 A1    Oct. 18, 2018

(51) Int. Cl.
  *G05B 19/04*     (2006.01)
  *G05B 19/409*    (2006.01)
  (Continued)

(52) U.S. Cl.
  CPC ......... *G05B 19/409* (2013.01); *G05B 19/402* (2013.01); *G06N 3/008* (2013.01);
  (Continued)

(58) Field of Classification Search
  CPC ................ G05B 19/409; G05B 19/402; G05B 2219/2625; G05B 2219/33192; G06N 3/008; G06N 20/00; Y10S 901/01
  See application file for complete search history.

(56) References Cited

U.S. PATENT DOCUMENTS

| 5,949,681 A * | 9/1999 | Asai ..................... H05K 13/021 700/113 |
| 9,353,514 B1 * | 5/2016 | Wine .................... G06Q 50/08 |

(Continued)

FOREIGN PATENT DOCUMENTS

| CN | 202583880 U | 12/2012 |
| CN | 102880176 A | 1/2013 |

(Continued)

OTHER PUBLICATIONS

"Roombots—Modular robotics for adaptive and self-organizing furniture", Biorobotics Laboratory (BioRob), http://biorob.epfl.ch/roombots, 11 pages, Accessed Jan. 10, 2017, Biorobotics Laboratory, EPFL.

(Continued)

*Primary Examiner* — Khoi H Tran
*Assistant Examiner* — Jorge O Peche
(74) *Attorney, Agent, or Firm* — Behmke Innovation Group LLC; Kenneth J. Heywood; Jonathon P. Western (57) ABSTRACT

In one embodiment, a device in a network receives a set of sensor data from a plurality of sensors deployed in a location. The device determines a physical layout for furnishings in the location based on the received set of sensor data. One or more of the furnishings is equipped with one or more actuators configured to move the equipped furnishing in one or more directions. The device generates an instruction for the one or more actuators of a particular one of the furnishings based on the determined physical layout for the furnishings. The device sends the instruction to the one or more actuators of the particular furnishing, to implement the determined physical layout.

17 Claims, 6 Drawing Sheets

(51) Int. Cl.
    *G05B 19/402*     (2006.01)
    *G06N 20/00*     (2019.01)
    *G06N 3/00*     (2006.01)

(52) U.S. Cl.
    CPC ..... *G06N 20/00* (2019.01); *G05B 2219/2625* (2013.01); *G05B 2219/33192* (2013.01); *Y10S 901/01* (2013.01)

(56) References Cited

U.S. PATENT DOCUMENTS

| | | | | |
|---|---|---|---|---|
| 9,824,573 | B1* | 11/2017 | Beres | G08B 21/24 |
| 9,921,726 | B1* | 3/2018 | Sculley | H04L 67/12 |
| 9,943,174 | B1* | 4/2018 | Jacobs | A47C 31/008 |
| 9,955,318 | B1* | 4/2018 | Scheper | G06Q 30/0281 |
| 10,031,500 | B1* | 7/2018 | Diaz | G05B 19/0426 |
| 10,044,196 | B1* | 8/2018 | Worley, III | H04B 5/0037 |
| 10,085,562 | B1* | 10/2018 | Labrosse | A47C 7/748 |
| 10,130,532 | B2* | 11/2018 | Mulhern | A61G 5/122 |
| 10,140,381 | B2* | 11/2018 | Trikha | G06F 16/986 |
| 10,262,019 | B1* | 4/2019 | Reiner | G06F 11/079 |
| 10,277,981 | B1* | 4/2019 | Frank | G10L 15/22 |
| 10,291,460 | B2* | 5/2019 | Zhang | H04B 17/309 |
| 10,388,136 | B2* | 8/2019 | Ryder | G08B 17/00 |
| 10,397,039 | B2* | 8/2019 | Zhang | H04B 1/38 |
| 2002/0029129 | A1* | 3/2002 | Satoh | G06F 30/13 702/182 |
| 2002/0047675 | A1* | 4/2002 | Hein | B60N 2/0248 318/34 |
| 2004/0249590 | A1* | 12/2004 | Ota | G01D 9/005 702/79 |
| 2005/0173199 | A1* | 8/2005 | Kawai | B66B 5/024 187/313 |
| 2008/0077298 | A1* | 3/2008 | Hattori | B60N 2/0244 701/49 |
| 2008/0312796 | A1* | 12/2008 | Matsuura | B60N 2/0248 701/49 |
| 2008/0315772 | A1* | 12/2008 | Knibbe | H05B 47/105 315/149 |
| 2011/0169386 | A1* | 7/2011 | Hardy | A47B 96/067 312/246 |
| 2012/0086249 | A1* | 4/2012 | Hotary | B60N 2/838 297/284.3 |
| 2015/0022374 | A1* | 1/2015 | Kim | H04W 4/70 340/870.16 |
| 2015/0149042 | A1* | 5/2015 | Cooper | H04W 4/48 701/48 |
| 2016/0063459 | A1* | 3/2016 | Li | G06Q 20/10 705/39 |
| 2016/0111109 | A1* | 4/2016 | Tsujikawa | G10L 21/0216 704/226 |
| 2016/0207497 | A1* | 7/2016 | Seal | B60N 2/2893 |
| 2016/0327933 | A1* | 11/2016 | Lohken | G08C 17/02 |
| 2016/0328941 | A1* | 11/2016 | Sundholm | G08B 21/0469 |
| 2017/0052538 | A1* | 2/2017 | Li | B60N 2/0248 |
| 2017/0168472 | A1* | 6/2017 | Ando | G06F 8/54 |
| 2017/0318360 | A1* | 11/2017 | Tran | A63F 13/245 |
| 2018/0070787 | A1* | 3/2018 | Gordon | A47L 9/2857 |
| 2018/0240322 | A1* | 8/2018 | Potucek | E04H 4/14 |
| 2018/0266220 | A1* | 9/2018 | Lee | G06N 3/084 |
| 2018/0271286 | A1* | 9/2018 | Jacobs | A47C 7/70 |
| 2018/0288586 | A1* | 10/2018 | Tran | A63F 11/00 |
| 2019/0029412 | A1* | 1/2019 | Gibson | H04Q 9/04 |
| 2019/0049968 | A1* | 2/2019 | Dean | G05D 1/0088 |
| 2019/0095852 | A1* | 3/2019 | Sanjay | G06Q 50/28 |
| 2019/0160980 | A1* | 5/2019 | Lin | B60N 2/2893 |
| 2019/0212752 | A1* | 7/2019 | Fong | G06K 9/00 |
| 2020/0015598 | A1* | 1/2020 | Hondori | A47C 7/723 |

FOREIGN PATENT DOCUMENTS

| | | | |
|---|---|---|---|
| CN | 203407684 U | | 1/2014 |
| CN | 103899098 A | | 7/2014 |
| CN | 106254835 A | * | 12/2016 |

OTHER PUBLICATIONS

"TUG Robots in Healthcare", http://www.aethon.com/tug/tughealthcare/, 3 pages, Accessed Jan. 10, 2017, Aethon Inc.
Dalton, et al., "Architecture and Interaction: Human Computer Interaction in Space and Place", https://books.google.com/books?id=IAVkDAAAQBAJ&pg=PA91&lpg=PA91&dq=automatically+configure+room+furniture+robot+iot&source=bl&ots=hZajKbTzQl&sig=Oc5SaWiHQnajDvlk3FUtTKYK_8&hl=en&sa=X&ved=0ahUKEwj4zfTmv4jQAhVBWGMKHS2yCPMQ6AEIHDAA#v=onepage&q=automatically%20configure%20room%20furniture%20robot%20iot&f=false, 343 pages, Jun. 9, 2016, Springer.
Green, et al., "CU-iMSE | Animated Work Environment", http://www.clemson.edu/centers-institutes/cuimse/portfolio/awe.html, 8 pages, Accessed Jan. 10, 2017, South Carolina, Clemson University.
Guta, Michael., "Voila! Ori Robotic Furniture Can Change Your Living Room to a Home Office in Seconds", https://smallbiztrends.com/2016/07/ori-robotic-furniture-small-home-office.html, 5 pages, Jul. 20, 2016, Small Business Trends.
Waurzyniak, Patrick., "Picking Up the Pace in Aerospace Production", http://advancedmanufacturing.org/picking-pace-aerospace-production/, 4 pages, Mar. 1, 2014, Advanced Manufacturing.
Automatic Guided Vehicle Solutions—Dematic Egemin; http://egeminusa.com/; pp. 1-4.
Roomba® Robot Vacuums | iRobot; http://store.irobot.com/default/robot-vacuum-roomba/?&gclid=COTb; pp. 1-6.
https://www.youtube.com/watch?v=62qj1Hw3KZI.
https://www.google.com/url?sa=t&rct=j&q=&esrc=s&source=web&cd=4&cad=rja&uact=8&ved=0ahUKEwiS3168j-PPAhXCvY8KHeA6BfwQtwllSzAD&url=https%3A%2F%2Fwww.youtube.com%2Fwatch%3Fv%3DFLEgvD7iG-M&usg=AFQjCNGz_F5Sc4Mc2kbx3l0yxAUi7l4HHQ.

\* cited by examiner

CONNECTING ROBOTIC MOVING SMART BUILDING FURNISHINGS

TECHNICAL FIELD

The present disclosure relates generally to computer networks, and, more particularly, to connecting robotic moving smart building furnishings.

BACKGROUND

An emerging area of interest in the field of computer networking is the "Internet of Things" (IoT), which may be used by those in the art to refer to uniquely identifiable objects/things and their virtual representations in a network-based architecture. In particular, the IoT involves the ability to connect more than just computers and communications devices, but rather the ability to connect "objects" in general, such as lights, appliances, vehicles, window shades and blinds, doors, locks, etc. Despite these advances, few efforts have been made to extend the IoT to furnishings, such as room dividers, workstations, partitions, book cases, file cabinets, marker boards, refreshment stations, screens, lockers, and the like.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network receives a set of sensor data from a plurality of sensors deployed in a location. The device determines a physical layout for furnishings in the location based on the received set of sensor data. One or more of the furnishings is equipped with one or more actuators configured to move the equipped furnishing in one or more directions. The device generates an instruction for the one or more actuators of a particular one of the furnishings based on the determined physical layout for the furnishings. The device sends the instruction to the one or more actuators of the particular furnishing, to implement the determined physical layout.

In further embodiments, and apparatus is disclosed. The apparatus includes a housing configured to couple to a furnishing in a location. The apparatus also includes a wireless receiver to receive a sent instruction, at least one wheel, and a wheel motor coupled to the at least one wheel. The apparatus further includes a processing circuit coupled to the wireless receiver and to the wheel motor. The instruction indicates that the wheel motor should be actuated and the processing circuit sends a control command to the motor based on the instruction received via the wireless receiver to move the furnishing.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services.

Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Figure 1:
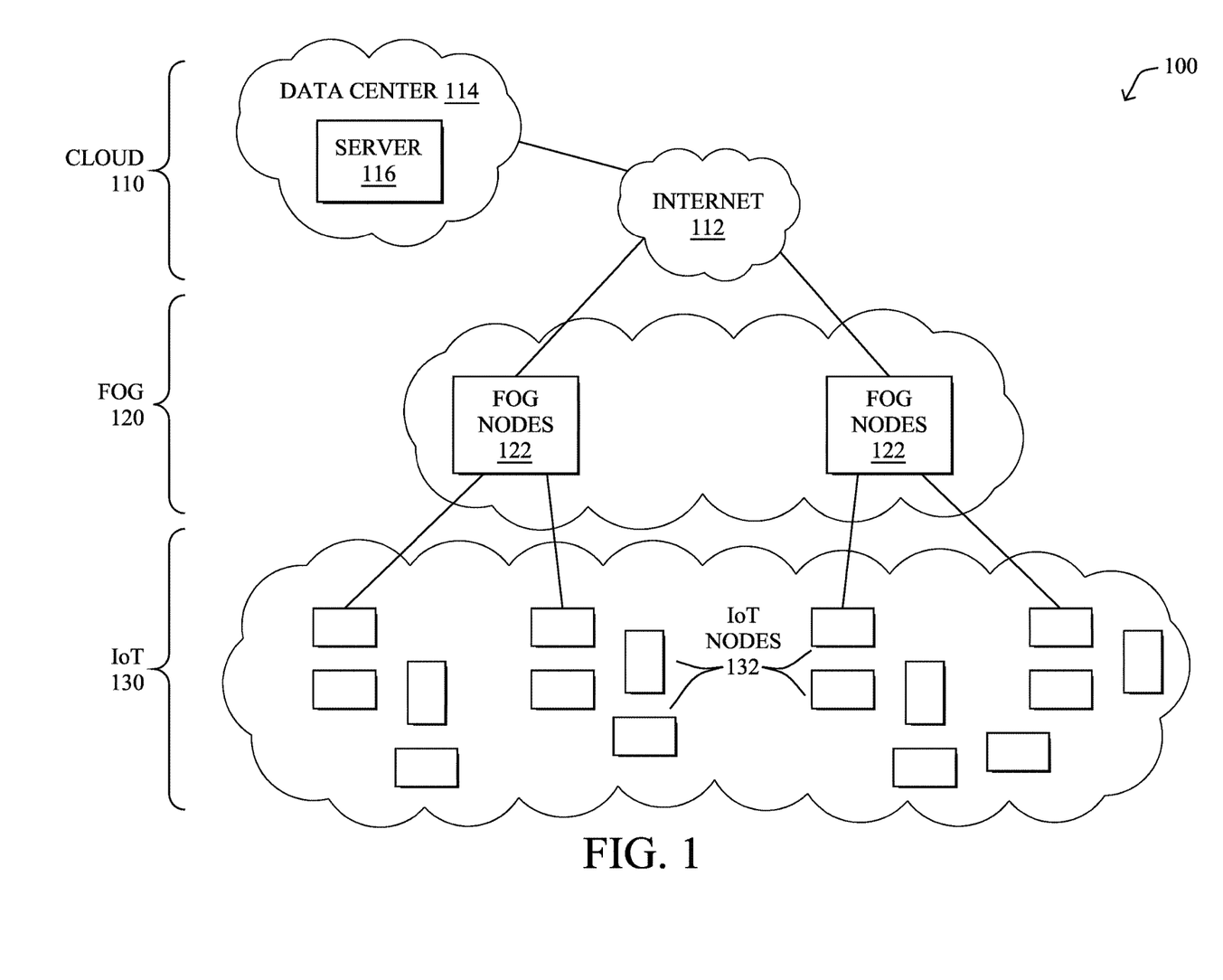
FIG. 1. illustrates an example communication network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
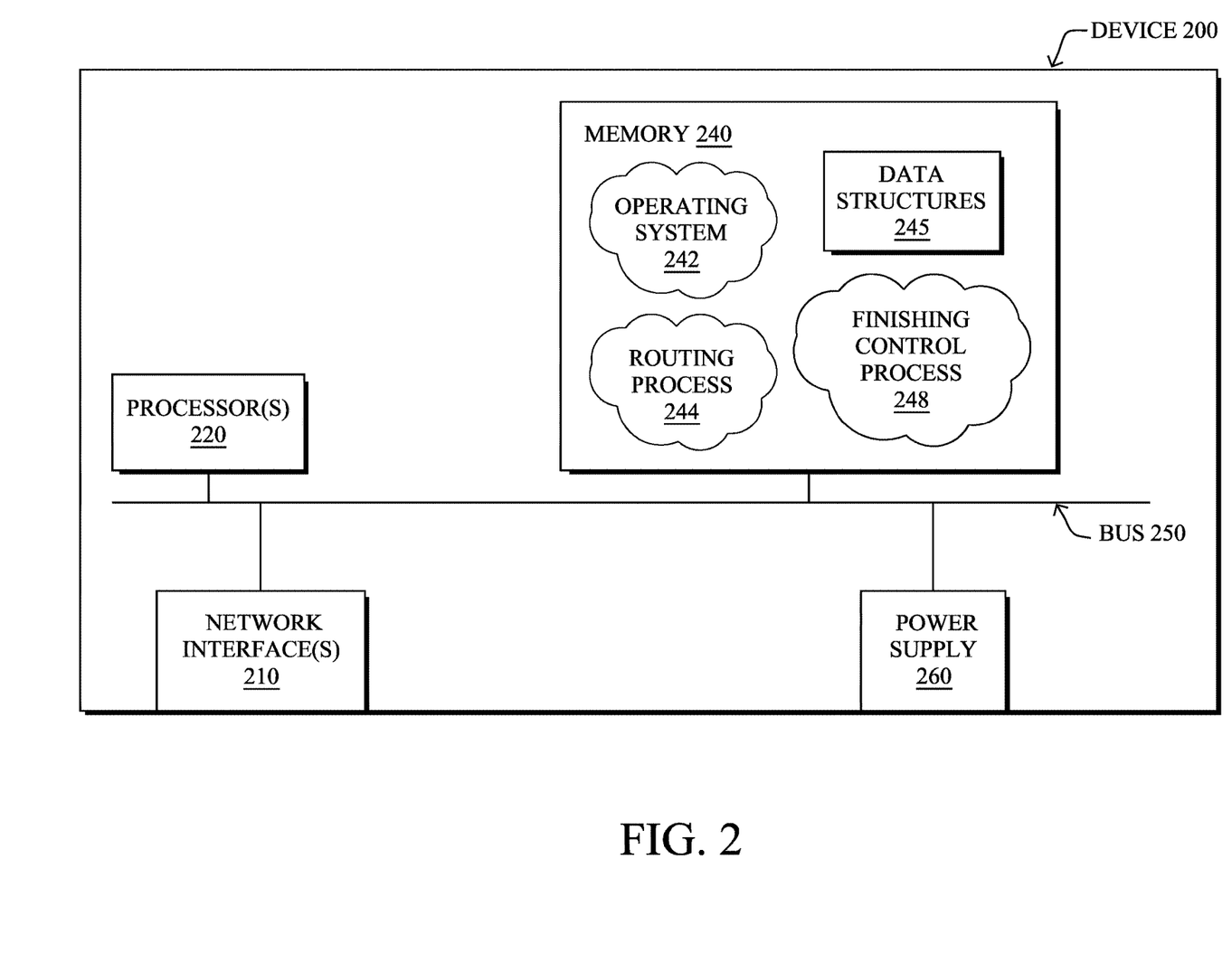
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative furnishing control process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 include computer executable instructions executed by processor 220 to perform functions provided by one or more routing protocols, such as an Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-12vpn-evpn>, introduce a solution for multipoint L2VPN services, with advanced multi-homing capabilities, using BGP for distributing customer/client media access control (MAC) address reach-ability information over the core MPLS/IP network.

Another example protocol that routing process 244 may implement, particularly in the case of LLN mesh networks, is the Routing Protocol for Low Power and Lossy (RPL), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

As noted above, few efforts have been made thus far to extend the IoT to furnishings. Indeed, the furnishings in today's smart buildings are not, in general, very smart. Despite the increasing deployment of sensors, fog computing, and controllable objects in smart buildings (e.g., lighting, etc.), furnishings (e.g., furniture, equipment, building amenities, etc.) in many smart buildings continue to remain un-networked and lacking any form of robotic control at all.

Today, many building furnishings are typically located at designated spots in a building's floorplan. To make adjustments to these layouts, a building occupant must go to the furnishings of interest, manually adjust their positions, and/or move them as desired during the day. This can also result in unwanted conditions, such as when an occupant moves a furnishing to an unintended location. For example, an occupant may move a fire extinguisher to an undesired location, occupants may move chairs out of one conference room into another without returning them, etc. This often leaves it to building maintenance staff to correct the situation and further move the furnishings as needed, e.g., to clean, inspect, and/or maintain the building and ensure convenience and safety for the occupants of the building.

In addition, the so-called "office hotel" open floor plans becoming common in many modern offices adds further challenges to the indoor environment. Notably, it often takes workers in these environments up to fifteen minutes or more per day to collect their materials, tools, and equipment from storage lockers, and move them to their work area. Then, it may take the same workers up to an additional fifteen minutes to put everything away each night. Thus, a large amount of productivity is lost in these types of environments.

Authorization rules can also complicate indoor space configuration, in some jurisdictions. For example, doing something as simple as relocating a conference table or moving a partition wall by a few centimeters may require a scheduled visit from one or more authorized laborers of the building. This can also be a very time-consuming endeavor that results in the loss of productivity. For example, if an authorized worker is not readily available to make the change, the occupant must wait until one is available before the configuration change can be made.

Connecting Robotic Moving Smart Building Furnishings

The techniques herein introduce a robotic apparatus that can be coupled to a furnishing, to control the positions of the furnishing in two or three dimensions within a given location. Further aspects of the techniques herein relate to networking methodologies that leverage a building's networking and sensing infrastructure to control the robotic-enabled furnishings in a given area. For example, fog computing can be used to coordinate with the robotic apparatuses, to determine and implement a layout for the furnishings in the location.

Specifically, according to one or more embodiments of the disclosure as described in detail below, a device in a network receives a set of sensor data from a plurality of sensors deployed in a location. The device determines a physical layout for furnishings in the location based on the received set of sensor data. One or more of the furnishings is equipped with one or more actuators configured to move the equipped furnishing in one or more directions. The device generates an instruction for the one or more actuators of a particular one of the furnishings based on the determined physical layout for the furnishings. The device sends the instruction to the one or more actuators of the particular furnishing, to implement the determined physical layout.

Illustratively, the techniques described herein may be performed by hardware, software, and/or firmware, such as in accordance with the furnishing control process 248, which may include computer executable instructions executed by the processor 220 (or independent processor of interfaces 210) to perform functions relating to the techniques described herein.

Figure 3:
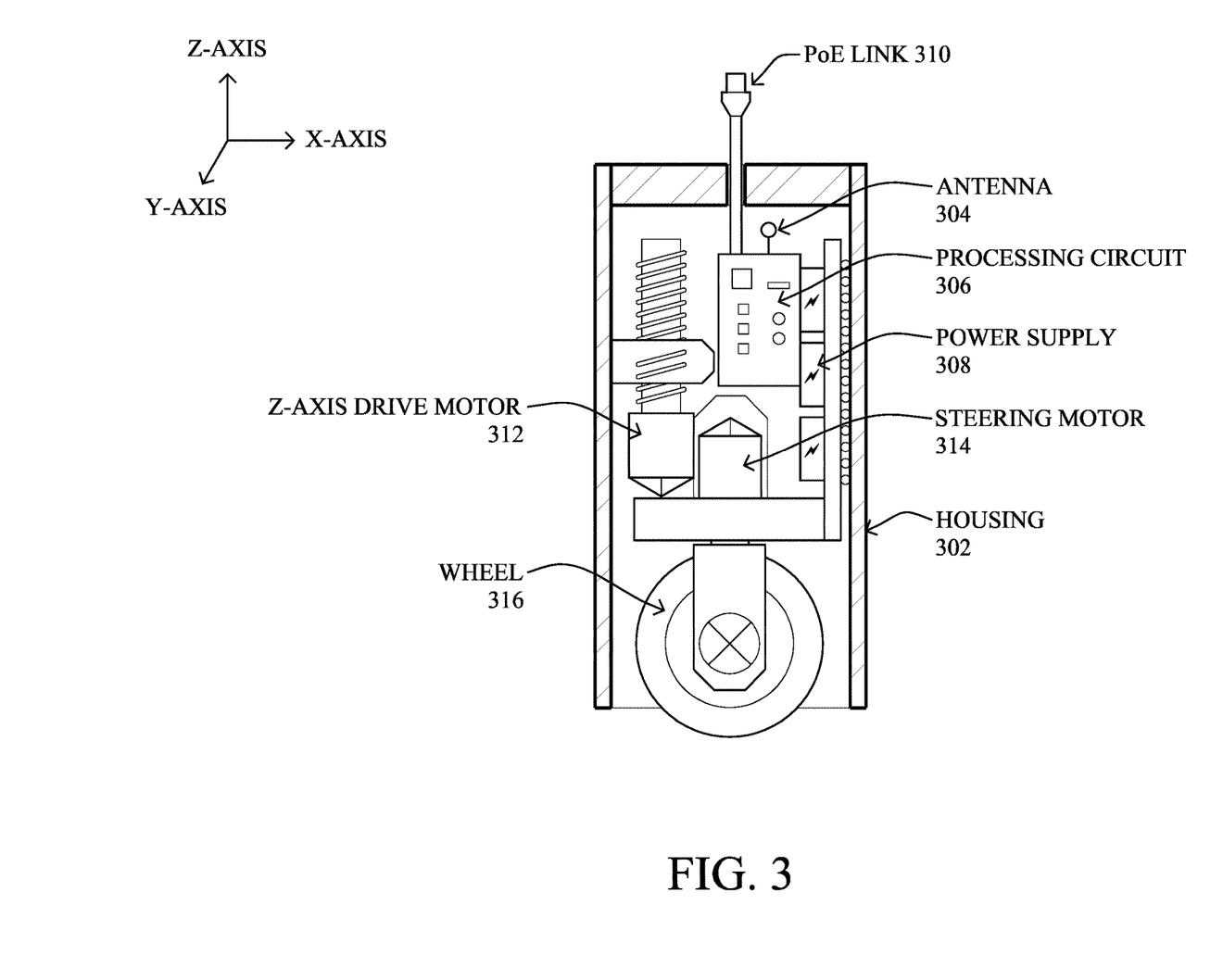
FIG. 3 illustrates an example robotic apparatus for furnishings.

Operationally, FIG. 3 illustrates an example robotic actuator 300 for furnishings, according to various embodiments. In general, actuator 300 may be a cartridge that can replace the legs or casters of common office furniture and the base of other building furnishings with one of more robotic actuators 300, or be built into newer furnishings directly. During use, the fog computers for the connected location may note the positions of the various objects and people in the space (e.g., using precision indoor locations of the robotic a, video analytics from surveillance camera feeds, optical sensors that read position markers off the floor, or the like), and command the motors in the cartridges to safely move the furnishings to where they are needed, while carefully avoiding obstacles or people.

As shown, robotic actuator 300 includes a housing 302 that may encase one or more of the other components 304-316 of robotic actuator 300. Housing 302 may be of any suitable shape or size, such as a substantially cylindrical shape, a parallelepiped, or the like, forming a substantially hollow interior portion. In some cases, housing 302 may also be telescopic, allowing housing to extend or contract in the z-axis direction. Housing 302 may also be of any suitable material such as metal, polymer, carbon fiber, or the like. The preferred embodiment of actuator 300 is shaped like a cylinder of approximately 100 mm in diameter and approximately 250 mm in height. However, other shapes and sizes may be formed in other embodiments. For example, miniature ones that are approximately half that size are also envisioned, as well as heavy duty ones that are approximately twice that size.

Attached to housing 302 may be a wheel 316 or multiple wheels, in various embodiments. For example, wheel 316 may be a caster wheel that can be rotated at an angle of up to 360° with respect to the x-y plane. To drive wheel 316, robotic actuator 300 may also include a steering motor 314 that may rotate wheel 316 about the z-axis and/or may drive wheel 316, to cause actuator 300 to roll along a surface. In further embodiments, separate motors may be used in actuator 300 to steer wheel 316 and drive wheel 316. For example, wheel 316 may be an approximately 80 mm diameter caster wheel driven by an approximately 100W motor, with a second motor the steer the wheel.

In some embodiments, actuator 300 may also include a z-axis motor drive 312 configured to raise and lower actuator 300 (and its coupled furnishing). For example, z-axis motor drive 312 may be coupled to wheel 316 and to housing 302 (e.g., via a lead screw) and either extend wheel 316 away from housing 302 or retract wheel 316 into housing 302. In other embodiments, z-axis motor drive 312 may be integrated into motor 314 and/or housing 302 may be telescopic, to facilitate the extending and contracting when motor 312 is actuated.

Apparatus 300 may further include a processing circuit 306 configured to receive instructions via an antenna 304 from a fog node in the network (e.g., a fog node/device 122). As shown, processing circuit 306 may be coupled to motors 312-314 and, based on the received instructions, send control commands to motors 312-314. For example, if the instruction indicates that actuator 300 should be extended by four inches, processing circuit 306 may actuate z-axis drive motor 312, accordingly. By way of example, processing circuit 306 may comprise an Arduino-class computer or other small form-factor computer, to control the components of actuator 300. Antenna 304 may, for example, be a Wi-Fi, LoRa, or other antenna that is part of a receiver or transceiver.

In some embodiments, processing circuit 306 may also include any number of local sensors. For example, processing circuit 306 may include one or more distance or motion sensors that it can use to capture information about the surroundings of the attached furnishing. In turn, processing circuit 306 may use this sensor data to adjust its control over motors 312-314 and/or report the captured sensor information to the fog node. For example, if actuator 300 is in the process of moving its furnishing across the room and an obstruction (e.g., a person, object, wall, etc.) is in the way, processing circuit 306 may sense the obstruction and stop the furnishing from collision with the obstruction.

To power the components of actuator 300, actuator 300 may also include a power supply 308 such as a battery, ultra capacitor, or other energy storage device. In some embodiments, power supply 308 may receive and store charge directly from the network itself. For example, as shown, actuator 300 may also include a Power over Ethernet (PoE) link 310, which may be bidirectional in some cases. In another embodiment, power supply 308 may be charged using a universal serial bus (USB) link or other data+power interfaces. In yet another embodiment, power supply 308 can also power an external load riding on the furnishing (e.g., to operate a mobile device charging port, energize a printer or display, etc.). Power supply 308 may also be configured to transfer energy between actuator 300 to another cartridge on the same furnishing that may be running low. In an additional embodiment, power supply 308 may be able to harvest energy from the environment for charging (e.g., by driving onto a conductive mat and coupling power through a conductive band on the wheels, or with an induction coil wound around the base of the cartridge receiving energy from a similar coil within the floor).

FIGS. 4A-4G illustrate example furnishings to which robotic actuator 300 may be attached, according to various embodiments. Generally, such furnishings could include furniture typically found in office, retail, or small business environments, like tables, chairs, sofas, bookcases, cupboards, display cases, etc. The furnishings could also include elements typically associated with modular office design including, but not limited to, room dividers, workstations, partitions, book cases, file cabinets, marker boards, refreshment stations, screens, and lockers. The furnishings could further include technology equipment, such as flat panel displays, video projectors, telepresence systems, digital signs, conventional printers, 3D printers, document scanners, shredders, and equipment racks. Various industry-specific furnishings, like medical/dental equipment carts, work tables, fixtures, assembly tools and maintenance systems could also be included. Finally, building emergency furnishings, like fire control equipment, first aid kits, spill control kits, AEDs, etc., could be included as furnishings, and quickly moved where needed under system control. As would be appreciated, the examples of furnishings herein are intended to be illustrative and not an exhaustive list.

Figure 4A:
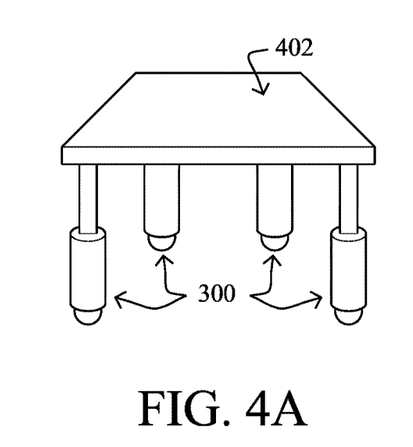
FIGS. 4A-4G illustrate example furnishings.
Figure 4B:
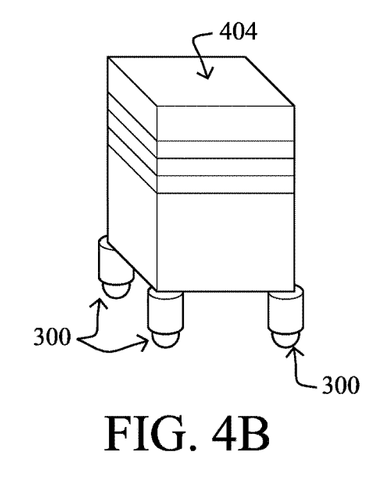
Figure 4C:
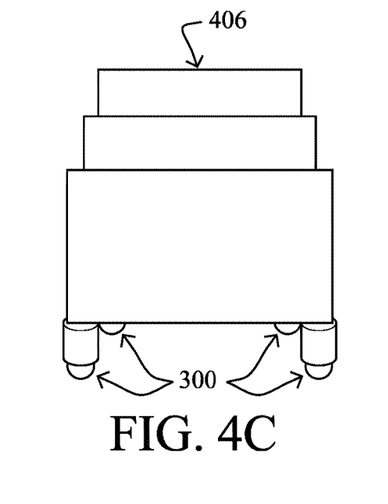
Figure 4D:
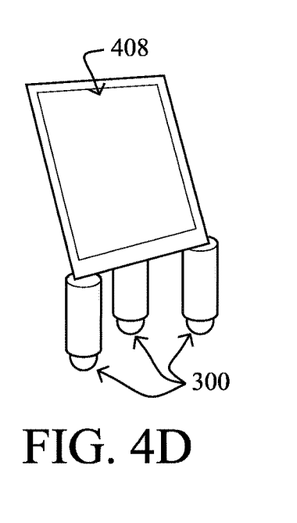
Figures 4E, 4F:
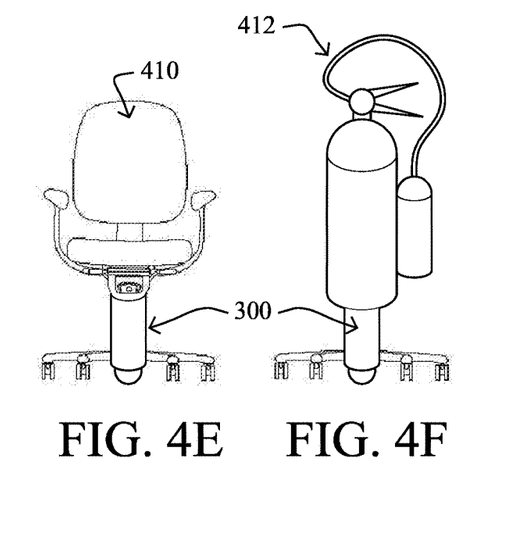
Figure 4G:
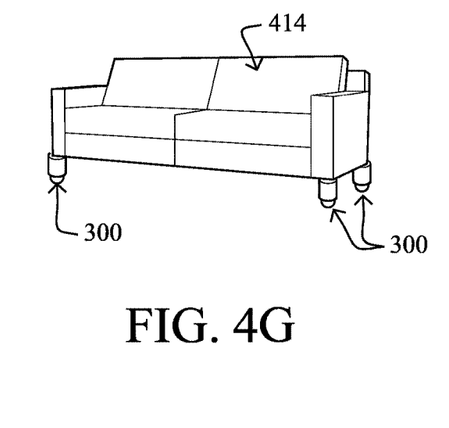

As shown generally in FIGS. 4A-4G, the number of robotic apparatuses 300 that may be attached to any given furnishing may vary. For example, in FIGS. 4A-4C, each of a table 402, server rack 404, and a privacy wall 406 may be equipped with four robotic apparatuses 300. Similarly, as in FIG. 4G, a couch 414 may also be equipped with four robotic apparatuses 300. However, video screen 408 in FIG. 4D may only require three robotic apparatuses 300, due to its thinness. In the case of a chair 410, as shown in FIG. 4E, there may already be a number of caster wheels attached to the chair. Thus, chair 410 may only need one robotic actuator 300, located at a central point between the existing wheels, to control the movement of chair 410. Finally, actuator 300 may also be coupled to other furnishings, such as a fire extinguisher 412, using a custom stand, as shown in FIG. 4F. Note that in cases in which a furnishing has only one robotic actuator 300, it may not be necessary to control the exact orientation of the furnishing during movement. For example, in the case of chair 410 or fire extinguisher 412 in FIGS. 4E-4F, it may be sufficient to simply drive the furnishing to its desired location and let the user manually orient the furnishing. Conversely, other furnishings that have two or more apparatuses 300 can be driven in coordination to move them to the desired position, as well as park them in the desired orientation and with closely controlled (millimeter precision) relationship with other robotic furnishings and the building's fixed structures. Heaver furnishings will typically use more copies of robotic apparatus 300, and may also use larger versions to supply the necessary movement forces.

Figure 5A:
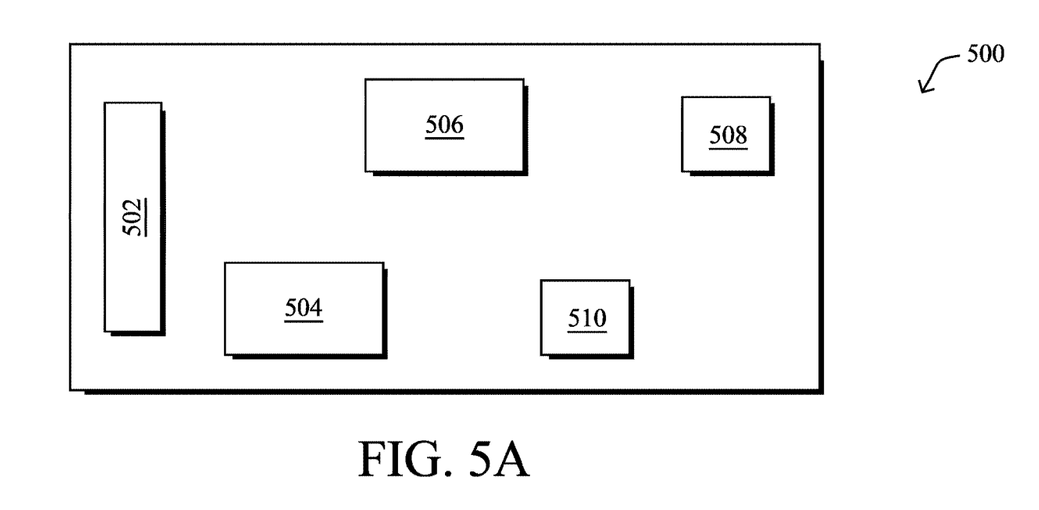
FIGS. 5A-5B illustrate example layouts for furnishings.
Figure 5B:
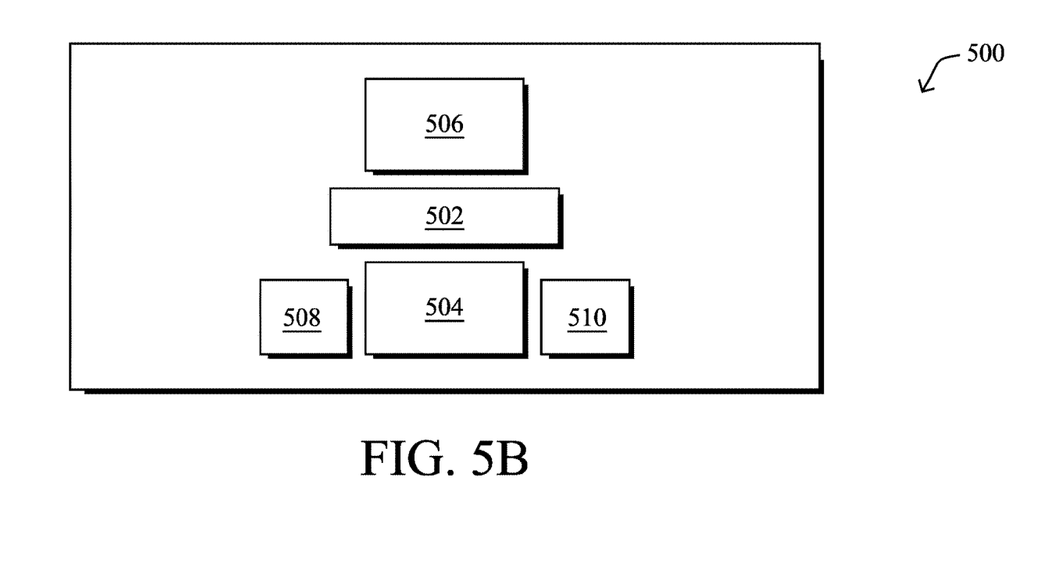

FIGS. 5A-5B illustrate example layouts for furnishings, according to various embodiments. In FIG. 5A, assume that location 500 (e.g., a portion of a floor in a building, etc.) currently has a number of furnishings 502-510, some or all of which may be equipped with robotic apparatuses 300. For example, furnishing 502 may be a noise divider/privacy wall, furnishings 504-506 may be tables, and furnishings 508-510 may be chairs.

During operation, sensors in the building and/or in the individual robotic apparatuses of furnishings 502-510 may provide sensor data to the fog environment. In turn, the fog computing device(s) may perform sensor fusion, to determine the current layout/position of furnishings 502-510 in location 500. For example, the fog computing device(s) may merge data from one or more cameras in location 500 with position, motion, or distance sensors attached to furnishings 502-510, to determine the current furnishing layout of location 500.

In various embodiments, the fog computing device(s) associated with location 500 may determine a physical layout for furnishings 502-510 that differs from the current layout shown in FIG. 5A. Notably, building occupants or automation systems in the building may generate requests for certain furnishing elements to be moved to specific empty positions location 500. For example, the fog device(s) may also receive input from a calendaring/scheduling system regarding an invite to n-number of people for a meeting. In turn, the fog computing device(s) may determine that a different layout is needed during the scheduled meeting, to accommodate the participants.

By way of example, the fog computing device(s) may determine that the layout shown in FIG. 5B is better suited to the upcoming needs of the occupants of location 500. In turn, the fog computing device(s) may send corresponding instructions to the robotic apparatuses coupled to furnishings 502-510, thereby causing them to move to the configuration shown in FIG. 5B.

Notably, conference reservation or collaboration systems can be integrated into the planning process, and specify the types of furnishings to deliver to specific areas of a building at specific times. Overhead surveillance cameras in location 500 may also detect the exact positions and orientations of all the furnishings 502-510 before and during their movement, as well as any obstacles or people that may get in their way. In addition, the fog computing device(s) may compute the desired paths for furnishings 502-510 to move, ensuring these paths are free from people or other obstacles, and don't interfere with each other as the furnishings 502-510 move to their new positions simultaneously.

During a move, the cameras and other sensors continuously monitor for anything getting in the way, and will immediately stop the motion if necessary. As a furnishing 502-510 approaches its desired position, multiple surveillance cameras and/or high resolution indoor location services can triangulate its exact position and orientation, and the fog node commands the motors in the cartridge(s) to drive in whatever direction is needed to park the device at the exact position requested (millimeter precision should be achievable).

In some embodiments, the fog computing device(s) may also leverage machine learning, to predict the desired locations of furnishings 502-510. For example, such a learning process may form a predictive model based on previous meetings or requests associated with location 500, such as meetings of similar size, at similar times, etc., to the current meeting under analysis. Concretely, a number of factors can be used as input features to the machine learning process, to determine the desired layout for furnishings 502-510. Assuming one creates room classes that have a specific preset number of chairs, tables, etc., then features such as number of attendees, whether a videoconference was scheduled, meeting title (e.g., contains Chalk Talk, All Hands, Executive, etc.), and the like, can be used along with the type of room layout chosen previously, to determine a room class. Alternatively, given a specific type of resource, the fog computing device(s) could use similar input features to train a linear regression model to predict how many of the resource (e.g., tables) will be needed. Such a model may also predict whether location 500 requires additional items such as privacy walls, additional tables, etc., based on the size of location 500. The fog computing devices can expand or contract the size and shape of location 500 by adding, subtracting or repositioning partition walls 502 representing the perimeter of the space.

Referring again to FIG. 4C, consider the operations of privacy wall 406, which may have a number of robotic apparatuses 300 coupled to its bottom portion. When not in use, it may be kept in a storage closet and have its energy stores continuously charged. However, when the furnishing controller (e.g., fog computing devices, etc.) determines that privacy wall 406 is needed, it may instruct privacy wall 406 to move to a specified location. For example, about 8 of these nominally four foot long walls could cluster to surround a space, creating a temporary private office. Once their drive and steering motors have them positioned right next to each other, the z-axis drive motor may causes the three telescoping sections to extend to the ceiling and floor and to seal the gaps between adjacent panels, creating a private, quiet space.

There are various potential embodiments for the z-axis drive of a robotic actuator 300, such as in the case of privacy wall 406. In one embodiment, the z-axis drive may drop housing 302 to the floor to anchor the furniture in place. In another embodiment, the z-axis drive may push a rod with a large amount of force out the top of the actuator 300, to drive the height of privacy wall 406. Finally, in another embodiment, the z-axis drive may wind a cable around the lead-screw to provide approximately three meters of controlled cable pull, which can be wound around pulleys, to drive complex extendable structures (e.g., the extendable wall sections, table leafs, seating recline motions, etc.). Conventional doors also would not be needed for these temporary spaces, in some embodiments. For example, if an occupant gets up to leave, the system could detect this, and command one of the partition walls to pivot out to create a temporary door. This scenario can greatly improve the security of a temporary quiet space. For example, if highly proprietary materials are in use within the room, the noise walls will stay locked to the floor and ceiling, and never create a door unless all people requesting entry have the appropriate security credentials.

The same robotic apparatuses 300 could also work on other common indoor space objects, in a similar manner. For example, table 402 shown in FIG. 4A could move to wherever it is needed, and flock with other tables to create whatever large work table, collaboration space, or classroom arrangement is requested. In such cases, the z-axis drive of apparatuses 300 can adjust their heights or extend leaves, which are helpful to customize a space, and also to facilitate nested stacking the tables in a minimum volume in their storage closet. Video screen 408 in FIG. 4D, or a plurality of screens, can roll up to provide more display area or various types of telepresence endpoints and virtual whiteboards on demand. Chairs (e.g., chair 410 in FIG. 4E) and sofas (e.g., couch 414 in FIG. 4G) could move themselves, which is good for conferences, and also helps the cleaning staff or cleaning robots to efficiently clean the space without interference from furnishings. Similarly, server rack 404 in FIG. 4B also illustrates the fact that various IT or manufacturing equipment such as computers, VR systems, servers, instruments, 3D scanners/printers, inspection instruments, machines, etc. can be moved in on demand to where they are needed, thus eliminating the need for staff to move to where the equipment is. When the workday is done, all these objects can move into their secure storage closets, where they can be recharged, and turning the carpeted space into a "blank slate" for easy cleaning overnight and reconfiguration the next morning to exactly match the day's scheduled events. This is particularly ideal for hotel or shared office environments, or multi-use spaces like school gymnasiums.

The exact positioning of the furnishings in the space could also evolve over time, and react to current conditions in a building. For example, if a noise wall interacts with microphones in the building's ceiling, it could actually measure its own effectiveness, and optimize its position based on these measurements, and isolate historically loud individuals. Also, machine learning techniques can be valuable to learn what furnishing placements and configurations work best for given situations, and help the automated systems optimize future configurations. Machine learning techniques can also help plan when and how the cartridges are charged and their energy is managed.

A number of use cases are also provided, to further illustrate the techniques herein:

(1) Say a cupboard is on the way of a robotic vacuum cleaner. With the techniques herein, the two devices negotiate so that the cupboard moves somewhere else until the vacuum is done cleaning under its previous location. With robotic vacuums today, they typically require that a beacon be placed on the furniture, so that the vacuum knows to avoid it. However, this then requires manual intervention, to clean the area.

In another embodiment, the cupboard may stay in place but the height of its feet may vary (e.g., through control of a z-axis motor drive) to allow the vacuum to pass below the furniture. Alternatively, the cupboard may be robotically controlled to move out of the way of the vacuum, thereby affording the vacuum access to its location. The intelligence behind these interactions can be implemented as a thing-to-thing interactions (e.g., between the robotic apparatus of the cupboard and the vacuum), managed by building level fog devices(s), managed in the cloud, or a combination thereof.

(2) Say a chair is needed in a meeting room, which is known based on the chair inventory with the room (e.g., there are currently four in the room), and the fog computing device(s) for the room are configured to interact with the scheduling/calendar application. For example, based on this, the fog computing device(s) may determine that there are five people that will be attending the next reserved time slot, or cameras may sense that a fifth person is standing without a chair. In such a case, the fog computing device(s) may negotiate with those of an adjacent room, to send an additional chair to the reserved room. To get there, the chair may need to open a door or call an elevator, and automatically avoid obstacles or humans on its way. All these interactions can happen without human intervention, with the aid of the building resident fog device(s).

(3) Say a hotel office occupant is about to start a confidential conference call, and needs audio privacy. She can use a smart device, voice command, or gesture to request the dispatch of a number of mobile partition walls (e.g., via the fog computing nodes or a cloud-based service). In turn, the controlling device(s) could dispatch the partition walls from their storage closet under their own power, open doors and program elevators along the path, and approach the user's location. Along the way, sensors in the partition walls, as well as sensors in the building infrastructure may cooperate to guide the motion, and ensure no people or other obstacles are struck as they move. Approximately eight mobile partition walls may move in to create a square around the user, although other numbers could be used to fit the instantaneous floor plan and/or different shapes and sizes. One moved to their target locations, they may make fine positions adjustments, and anchor themselves in place. Then, the z-axis drive motors of their coupled robotic apparatuses may cause the moving portions of the wall to extend to the floor, ceiling, or move laterally to touch adjacent panels, creating a acoustically isolated space. Should the user wish to leave, she need only get up and walk toward a partition wall, which will instantly unlatch from the ceiling and adjacent walls, and swing out to create a door.

(4) Say building maintenance is needed, for instance, to paint a wall in a location. In turn, a safe distance from that wall may be determined (e.g., a line parallel to that wall is drawn at a safe distance) and all furniture is instructed to move away from that line. The pieces of furniture must decide together where each should move such that the final arrangement is not in the way of occupants. In addition, the movement may be coordinated such that any transient layouts also do not block occupants or result in collisions. Temporary barricades could also be mobilized and moved into place on demand, to keep occupants out of the maintenance zone. With the techniques herein, the piece of furniture is aware of its footprint and can negotiate its place.

In a particular embodiment, additional sensors could be placed at the edges of the piece of furniture, so the piece of furniture is aware of its volume, and it can negotiate its move within the room with other pieces of furniture, or get instructions from a room controller that supervises it all.

(5) In an office hotel environment, at the end of a day, an occupant can leave their equipment and personal belongings on their work table and leave the building. The robotic table moves to a storage closet, where robot arms remove the items and place them into a secure storage locker. The work table then moves to a storage closet where it is recharged. The next morning, the system detects the approach of the worker, assigns a work table from the storage closet, drives it under the robot arm, which retrieves the belongings and equipment from the locker, arranges them exactly where they were removed the previous night, and drives the loaded table to the worker's preferred location in the building.

(6) In a small flat, a room may serve as bedroom at night and study by day. A room controller may actually drive a schedule that incorporates putting the bed in vertical position, running a robotic vacuum at a defined time, and placing the study in position for the day activity, all triggered by the room occupant detected in the shower or having coffee in the kitchen.

Figure 6:
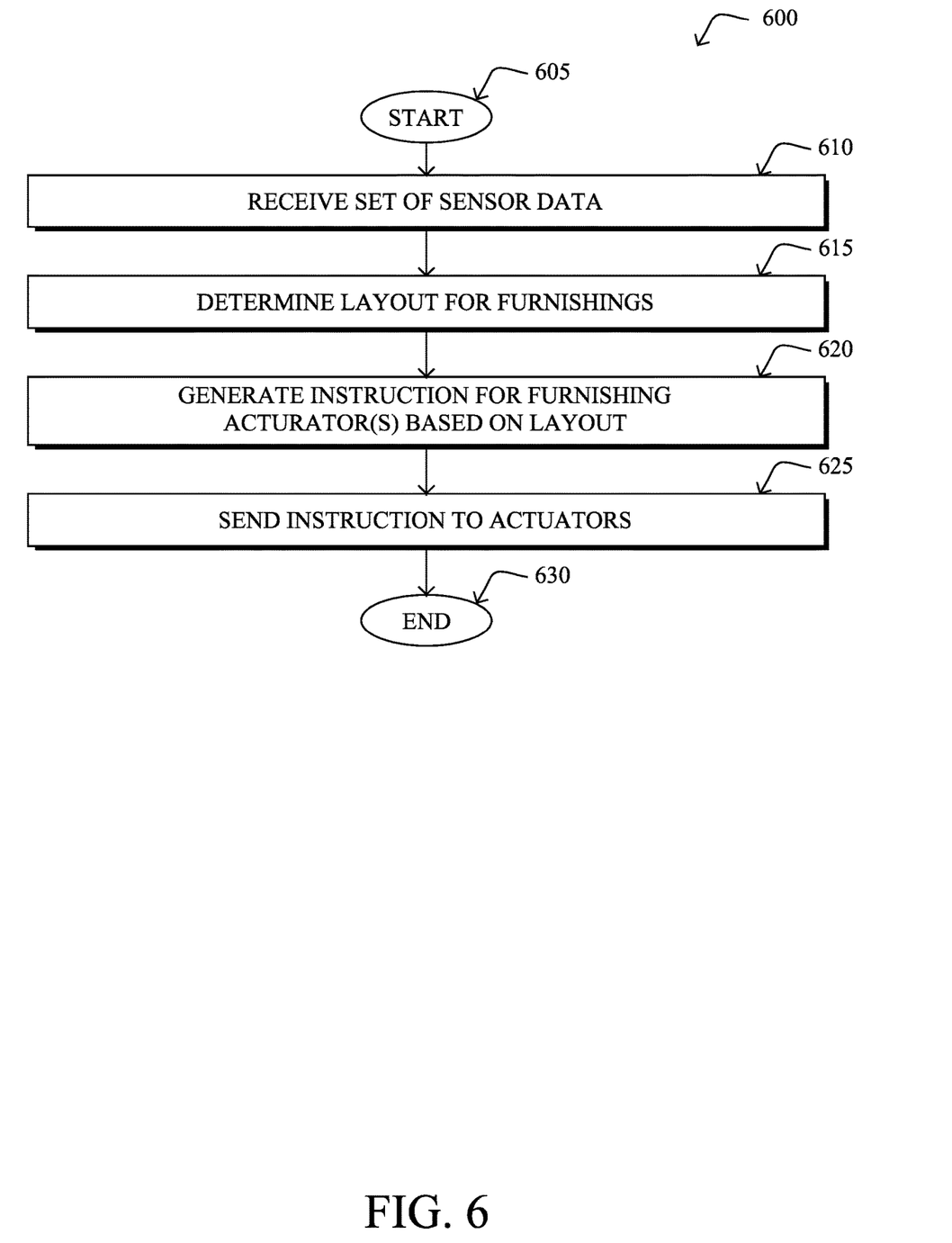
FIG. 6 illustrates an example simplified procedure for controlling robotic furnishings in a location.

FIG. 6 illustrates an example simplified procedure for controlling robotic furnishings in a location, in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, a device in a network (e.g., a fog computing device such as a router, a cloud or locally-based server, etc.) may receive a set of sensor data from a plurality of sensors deployed in a physical location. Such sensors may include, but are not limited to, cameras, microphones, motion sensors, distance sensors, force sensors, and/or sensors of robotic apparatuses configured to move furnishings in the location.

At step 615, as detailed above, the device may determine a desired layout for the furnishings in the area based on the received sensor data. In various embodiments, one or more of the furnishings is equipped with one or more actuators configured to move the equipped furnishing in one or more directions. The layout may be determined based on a user request for the particular layout, in response to input from another system (e.g., a calendaring/scheduling system, a fire or other emergency system, social media, etc.), or based on a machine learning-based prediction regarding the needed layout for the occupant(s) of the area. For example, if occupants of the location in the past have manually configured a layout for the furnishings, the device may determine that this layout should again be used when these occupants next have the location reserved.

At step 620, the device may generate an instruction for the one or more actuators of a particular one of the furnishings based on the determined physical layout for the furnishings, as described in greater detail above. For example, such an instruction may instruct the actuator(s) to move in a specified direction, along a specified path, and/or along a specified distance, to move the particular furnishing to its corresponding location and orientation in the determined layout. In some embodiments, the instruction may also specify a height to which the z-axis actuator(s) are to extend or retract, if so equipped.

At step 625, the device then sends the instruction to the one or more actuators, to implement the physical layout for the furnishings. For example, if a fire or smoke alarm is signaled, the device may instruct furnishings in the area to rearrange themselves to create an optimal exit path for occupants of the area. Procedure 600 then ends at step 630.

It should be noted that while certain steps within procedures 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, encompass the following aspects:

Using overhead security cameras and building fog nodes to control and coordinate the furnishings' movements, greatly reducing the system's cost because the individual actuators can be much simpler than typical office-environment robots.

The system may use sensor fusion for navigation and safety, using at least two of: overhead surveillance cameras, Wi-Fi precision localization services, bumper sensors on actuators, cameras on the furnishings, optical sensors to detect floor markings, wheel rotation sensors, or the like. This sensor fusion could happen in fog nodes on the furnishings and in the building's infrastructure and potentially in a collaborative manner.

The application of machine learning to predict the optimal furnishing resources and their arrangement needed to satisfy all the occupants of a building throughout the day.

The potential to implement furnishing layouts automatically for purposes of fire safety. For example, if a fire alarm is triggered, all the partition walls that are in use may immediately retract to ~3' height, allowing water from the overhead building sprinklers to reach all parts of the space. In many cases, the reason most office partitions do not extend to the ceiling is due to their blockage of sprinklers. Similarly, in the case of an evacuation alarm, all furnishings can move to make evacuation routes for building occupants.

Robotic actuators can be offered in smaller, low-profile versions that could replace casters, and can be retrofit to existing furnishings to make a legacy building smarter. Conversely, they could also be made larger to support devices that way a ton or more.

The techniques may also apply hierarchical fog computing techniques, thereby coordinating between nodes in the robotic actuators, nodes in the ceiling, and building/campus nodes to plan, navigate and manage the movements of the furnishings.

While there have been shown and described illustrative embodiments that provide for connecting robotic moving smart building furnishings, it is to be understood that various other adaptations and modifications may be made within the spirit and scope of the embodiments herein. For example, while certain embodiments are described herein with respect to using certain models for purposes of machine learning, the models are not limited as such and may be used for other functions, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device in a network, a set of sensor data from a plurality of sensors deployed in a location comprising a plurality of furnishings, wherein one or more of the furnishings is equipped with one or more actuators configured to move the equipped furnishing in one or more directions;
   predicting, by the device, a desired physical layout of the furnishings for an upcoming event in the location according to a machine learning-based predictive model using as input one or more characteristics of the upcoming event, wherein the predictive model is trained based on one or more characteristics of previous events in the location;
   determining, by the device, a new physical layout of the furnishings in the location based on the predicted desired physical layout;
   generating, by the device, an instruction for the one or more actuators of a particular one of the furnishings based on the determined new physical layout; and
   sending, by the device, the instruction to the one or more actuators of the particular furnishing, to implement the determined new physical layout.

2. The method as in claim 1, wherein the one or more actuators of the particular furnishing comprise:
   a wireless receiver to receive the sent instruction;
   at least one wheel;
   a wheel motor coupled to the at least one wheel; and
   a processing circuit coupled to the wireless receiver and to the wheel motor, wherein the instruction requests the wheel motor be actuated, and wherein the processing circuit sends a control command to the motor based on the instruction received via the wireless receiver to move the particular furnishing.

3. The method as in claim 2, wherein the one or more actuators of the particular furnishing further comprise:
   a z-axis motor drive coupled to the processing circuit and configured to raise or lower the particular furnishing when actuated, wherein the instruction indicates that the z-axis motor should be actuated, and wherein the processing circuit sends a control command to the z-axis motor based on the instruction received via the wireless receiver.

4. The method as in claim 1, wherein the device is a fog computing device, the method further comprising:
   receiving, at the device, at least a portion of the set of sensor data from one or more other fog computing devices in the network that use sensor fusion to process the portion of the set of sensor data.

5. The method as in claim 4, wherein the fog computing device is a network router.

6. The method as in claim 1, wherein the predictive model uses as input a number of attendees in the upcoming event.

7. The method as in claim 6, wherein the predicted desired physical layout is further based on input from a social media system or from a conference scheduling system.

8. The method as in claim 1, wherein at least one of the plurality of sensors includes a fire or smoke alarm, wherein at least one of the furnishings includes a retractable partition wall, and wherein, when the fire or smoke alarm is triggered, the instruction causes one or more actuators of the partition wall to retract the partition wall.

9. The method as in claim 1, further comprising:
providing power, via the network, to the one or more actuators.

10. An apparatus comprising:
one or more network interfaces to communicate with a network;
a processor coupled to the network interfaces and configured to execute one or more processes; and
a memory configured to store a process executable by the processor, the process when executed configured to:
receive a set of sensor data from a plurality of sensors deployed in a location comprising a plurality of furnishings, wherein one or more of the furnishings is equipped with one or more actuators configured to move the equipped furnishing in one or more directions;
predict a desired physical layout of the furnishings for an upcoming event in the location according to a machine learning-based predictive model using as input one or more characteristics of the upcoming event, wherein the predictive model is trained based on one or more characteristics of previous events in the location;
determine a new physical layout of the furnishings in the location based on the predicted desired physical layout;
generate an instruction for the one or more actuators of a particular one of the furnishings based on the determined new physical layout; and
send the instruction to the one or more actuators of the particular furnishing, to implement the determined new physical layout.

11. The apparatus as in claim 10, wherein the one or more actuators of the particular furnishing comprise:
a wireless receiver to receive the sent instruction;
at least one wheel;
a wheel motor coupled to the at least one wheel;
a processing circuit coupled to the wireless receiver and to the wheel motor, wherein the instruction requests that the wheel motor be actuated, and wherein the processing circuit sends a control command to the motor based on the instruction received via the wireless receiver to move the particular furnishing; and
a z-axis motor drive coupled to the processing circuit and configured to raise or lower the particular furnishing when actuated, wherein the instruction indicates that the z-axis motor should be actuated, and wherein the processing circuit sends a control command to the z-axis motor based on the instruction received via the wireless receiver.

12. The apparatus as in claim 10, wherein the apparatus is a fog computing device, and wherein the process when executed is further configured to:
receive at least a portion of the set of sensor data from one or more other fog computing devices in the network that use sensor fusion to process the portion of the set of sensor data.

13. The apparatus as in claim 12, wherein the fog computing device is a network router.

14. The apparatus as in claim 10, wherein the predictive model uses as input a number of attendees in the upcoming event.

15. The apparatus as in claim 14, wherein the predicted desired physical layout is further based on input from a social media system or from a conference scheduling system.

16. The apparatus as in claim 10, wherein at least one of the plurality of sensors includes a fire or smoke alarm, wherein at least one of the furnishings includes a retractable partition wall, and wherein, when the fire or smoke alarm is triggered, the instruction causes one or more actuators of the partition wall to retract the partition wall.

17. The apparatus as in claim 10, wherein the process when executed is further configured to:
determine the new physical layout automatically and not in response to a request for the new physical layout from a user interface.

* * * * *